G. E. ANDRE.
BEARING.
APPLICATION FILED JULY 31, 1920.

1,395,244.

Patented Nov. 1, 1921.

Inventor
Gustaf E. Andre
BY G. L. Cragg
Attorney

UNITED STATES PATENT OFFICE.

GUSTAF E. ANDRE, OF CHICAGO, ILLINOIS.

BEARING.

1,395,244.  Specification of Letters Patent.  Patented Nov. 1, 1921.

Application filed July 31, 1920. Serial No. 400,337.

*To all whom it may concern:*

Be it known that I, GUSTAF E. ANDRE, a citizen of the United States, residing at Chicago, in the county of Cook and State of Illinois, have invented a certain new and useful Improvement in Bearings, of which the following is a full, clear, concise, and exact description.

My invention relates to bearings employing elongated rollers. The bearing structure of my invention employs a retaining cage for the rollers that includes connected end rings to prevent endwise displacement of the rollers and a plurality of U-shaped portions included in the connections between said rings and distributed around the inner raceway in the space between the raceways, the base of each U-shaped portion being between adjacent rollers, while the sides of each U-shaped portion serve to space the rollers apart. The base of each U-shaped portion above mentioned is preferably located upon one side of the narrowest space between the rollers that have such base between them and this base is preferably made wider than such narrow space to prevent displacement of the rollers by a movement in the zone of the cage. If the displacing movement to be guarded against is inward the U-bases are placed nearer the inner raceway. If the displacing movement to be guarded against is outward the U-bases are then placed nearer the outer raceway.

My invention, in its preferred embodiment, includes a further formation whereby both inward and outward displacing movements of the rollers are guarded against and to this end the sides of the U-shaped portions are connected with the end rings by widened continuations, the U-bases being upon one side of the narrowest spaces between the rollers and said widened continuations being upon the other side of the narrowest spaces whereby the rollers are held from displacing movement in either direction in the zone of the cage whether such cage be in place between the raceways or is disassembled from the raceways. The sides of the U-shaped portions serve as spacers between adjacent rollers.

Figure 1:
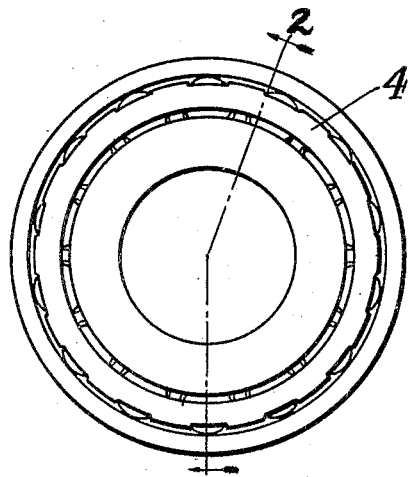
Figure 2:
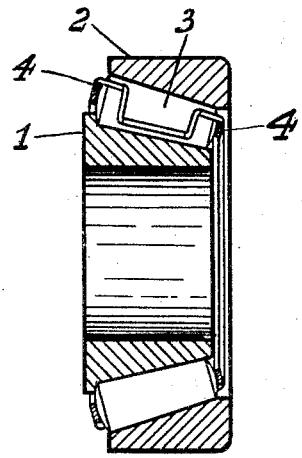
Figure 3:
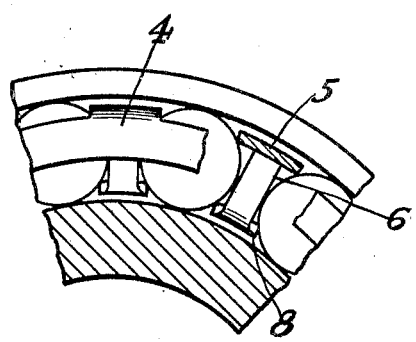
Figure 4:
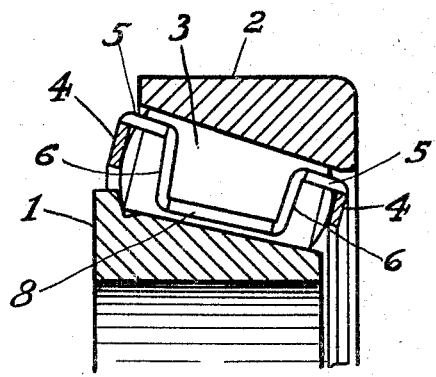
Figure 5:
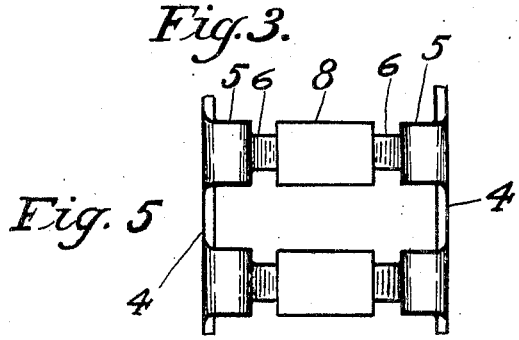

I will explain my invention more fully by reference to the accompanying drawing showing the preferred embodiment thereof and in which Figure 1 is an end view; Fig. 2 is a sectional view on line 2—2 of Fig. 1; Fig. 3 is an end view, partially in section and with some parts broken away, of a portion of the bearing illustrated in Fig. 1, Fig. 3 being upon a larger scale; Fig. 4 is a view, on a larger scale, of a part of the structure as it appears in Fig. 2; and Fig. 5 is a side view of a part of the cage of my invention.

Like parts are indicated by similar characters of reference throughout the different figures.

The bearing illustrated includes an inner raceway 1, an outer bearing member 2, and bearing rollers 3 disposed in the general zone of the raceways and elongated and tapering to be conical. The opposed faces of the raceways upon which the rollers turn are tapered corresponding to the conical tapering of the rollers. The retaining cage for the rollers includes connected end rings 4 that engage the ends of the rollers to prevent displacement thereof endwise of the bearing. The connections between these rings include parts 5 connecting the rings with the sides 6 of U-shaped portions that serve as spacers between adjacent rollers, these U-sides passing through the narrowest spaces that intervene between adjacent rollers. As I have illustrated my invention the connecting parts 5 and the bases 8 of the U-shaped portions are upon opposite sides of the narrowest spaces intervening between the rollers and the portions 5 and 8 are preferably made wider than such narrowest spaces so that the rollers are prevented from being displaced by a movement either inward or outward in the zone of the cage whether such cage be in place between the raceways or is disassembled therefrom.

The roller retaining cage is desirably made of sheet metal so that the rollers may be inserted into position by suitably springing parts of the cage to afford passage for the rollers. The invention, however, is not to be limited to this characteristic. If the inner raceway is so formed as to be in permanent assembly with the rollers and their cage, the bases 8 of the U-shaped portions need not be made wider than the narrowest spaces between the rollers for then the inward displacing movement of the rollers would always be guarded against by the inner raceway.

Conversely, if the outer raceway is so formed as to be in permanent assembly with the rollers and their cage, the connecting parts 5 need not be made wider than the narrowest spaces between the rollers for then outward displacing movement of the rollers would always be guarded against by the outer raceway.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A bearing structure including elongated rollers; inner and outer raceways for said rollers that are disposed between said raceways; and a retaining cage for said rollers, said cage including connected end rings to prevent endwise displacement of said rollers and a plurality of U-shaped portions included in the connections that unite said rings and distributed in the space between the raceways, the base of each U-shaped portion being between adjacent rollers and upon one side of the narrowest space between these rollers and being wider than this space to prevent displacement of the rollers by a movement in the zone of the cage, while the sides of each U-shaped portion are narrower than the base of such portion and serve to space the rollers apart.

2. A bearing structure including elongated rollers; inner and outer raceways for said rollers that are disposed between said raceways; and a retaining cage for said rollers, said cage including connected end rings to prevent endwise displacement of said rollers and a plurality of U-shaped portions included in the connections that unite said rings and distributed in the space between the raceways, the base of each U-shaped portion being between adjacent rollers, while the sides of each U-shaped portion serve to space the rollers apart, connections between said end rings also including parts in the zone of the rollers and upon one side of the narrowest spaces between the rollers, said parts being wider than said narrowest spaces and also wider than said sides of the U-shaped portions.

3. A bearing structure including elongated rollers; inner and outer raceways for said rollers that are disposed between said raceways; and a retaining cage for said rollers, said cage including connected end rings to prevent endwise displacement of said rollers and a plurality of U-shaped portions included in the connections that unite said rings and distributed in the space between the raceways to space the rollers apart, the base of each U-shaped portion being between adjacent rollers, connections between said end rings also including parts in the zone of the rollers and upon one side of the narrowest spaces between the rollers, said parts being wider than said narrowest spaces and also wider than the roller spacing parts of the connections between the end rings.

In witness whereof I hereunto subscribe my name this 28th day of July, A. D. 1920.

GUSTAF E. ANDRE.